US011859467B2

(12) United States Patent
Pandya et al.

(10) Patent No.: US 11,859,467 B2
(45) Date of Patent: Jan. 2, 2024

(54) RESERVOIR SIMULATION SYSTEMS AND METHODS TO DYNAMICALLY IMPROVE PERFORMANCE OF RESERVOIR SIMULATIONS

(71) Applicant: Landmark Graphics Corporation, Houston, TX (US)

(72) Inventors: Raja Vikram R. Pandya, Katy, TX (US); Satyam Priyadarshy, Herndon, VA (US); Keshava Prasad Rangarajan, Sugarland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 538 days.

(21) Appl. No.: 16/651,640

(22) PCT Filed: Mar. 5, 2019

(86) PCT No.: PCT/US2019/020754
§ 371 (c)(1),
(2) Date: Mar. 27, 2020

(87) PCT Pub. No.: WO2020/180303
PCT Pub. Date: Sep. 10, 2020

(65) Prior Publication Data
US 2021/0230977 A1 Jul. 29, 2021

(51) Int. Cl.
*E21B 41/00* (2006.01)
*G06F 30/28* (2020.01)
(Continued)

(52) U.S. Cl.
CPC ............. *E21B 41/00* (2013.01); *G06F 30/28* (2020.01); *E21B 2200/20* (2020.05); *G06F 2111/08* (2020.01); *G06F 2113/08* (2020.01)

(58) Field of Classification Search
CPC ...... E21B 41/00; E21B 2200/20; G06F 30/28; G06F 2113/08; G06F 2111/08; G06F 30/13; G06T 17/05
See application file for complete search history.

(56) References Cited

U.S. PATENT DOCUMENTS 7,640,149 B2    12/2009  Rowan et al.
2012/0215502 A1*  8/2012  Mijares et al. ........... G06F 7/10
(Continued)

FOREIGN PATENT DOCUMENTS

WO    2007060446 A1    5/2007
WO    2015019078 A1    2/2015

OTHER PUBLICATIONS

Dmitry Bagaev et al. "Dynamic Optimization of Linear Solver Parameters in Mathematical Modelling of Unsteady Processes" Lomonosov Moscow State University, Moscow 119991, Russia Dorodnicyn Computing Centre, FRC CSC RAS, Moscow 119333, Russia © Springer International Publishing AG 2017 (Year: 2017).*
(Continued)

*Primary Examiner* — Eunhee Kim
(74) *Attorney, Agent, or Firm* — Barnes & Thornburg, LLP

(57) ABSTRACT

The disclosed embodiments include reservoir simulation systems and methods to dynamically improve performance of reservoir simulations. The method includes obtaining input variables for generating a reservoir simulation of a reservoir, and generating the reservoir simulation based on the input variables. The method also includes determining a variance of computation time for processing the reservoir simulation. In response to a determination that the variance of computation time is less than or equal to a threshold, the method includes performing a first sequence of Bayesian Optimizations of at least one of internal and external parameters that control the reservoir simulation to improve per-
(Continued)

formance of the reservoir simulation. In response to a determination that the variance of computation time is greater than the threshold, the method includes performing a second sequence of Bayesian Optimizations of at least one of the internal and external parameters.

23 Claims, 4 Drawing Sheets

(51) Int. Cl.
*G06F 113/08* (2020.01)
*G06F 111/08* (2020.01)

(56) References Cited

U.S. PATENT DOCUMENTS

| | | | |
|---|---|---|---|
| 2017/0335662 A1* | 3/2017 | Torrado et al. | E21B 41/00 |
| 2018/0218098 A1* | 8/2018 | Hinley et al. | E21B 43/00 |
| 2018/0306030 A1* | 10/2018 | Priyadarshy et al. | E21B 49/005 |

OTHER PUBLICATIONS

Ilya Mishev et al. "Linear Solver Performance Optimization in Reservoir Simulation Studies" SPE, Exxon Mobil Upstream Research Company, and Nelli Fedorova and Serge Terekhov, NeurOk TechSoft. 2009 SPE Reservoir Simulation Symposium held in The Woodland. (SPE 119266). (Year: 2009).*

Choudhary et al. "Application of Global Optimization Methods for History Matching and Probabilistic Forecasting—Case Studies" 15th SPE Middle East Oil & Gas Show and Conference held in Bahrain International Exhibition Centre, Kingdom of Bahrain, Mar. 11-14. (SPE 105208) (Year: 2007).*

International Search Report and Written Opinion date dated Dec. 4, 2019, International PCT Application No. PCT/US2019/020754.

Mishev, Ilya D., et al. "Linear solver performance optimization in reservoir simulation studies." SPE Reservoir Simulation Symposium. Society of Petroleum Engineers, 2009.

Bagaev, Dmitry, Igor Konshin, and Kirill Nikitin. "Dynamic optimization of linear solver parameters in mathematical modelling of unsteady processes." Russian Supercomputing Days. Springer, Cham, 2017.

* cited by examiner

RESERVOIR SIMULATION SYSTEMS AND METHODS TO DYNAMICALLY IMPROVE PERFORMANCE OF RESERVOIR SIMULATIONS

BACKGROUND

The present disclosure relates generally to reservoir simulation systems and methods to dynamically improve performance of reservoir simulations.

Reservoir simulations are sometimes run to analyze, predict, and simulate downhole environments. However, reservoir simulations sometimes cost a significant amount of computing resources, such as a number of processing units to run. Moreover, an increase in the number of processing units sometimes does not proportionally decrease the amount of computing time to run the simulations.

BRIEF DESCRIPTION OF THE DRAWINGS

Illustrative embodiments of the present disclosure are described in detail below with reference to the attached drawing figures, which are incorporated by reference herein, and wherein.

Figure 1:
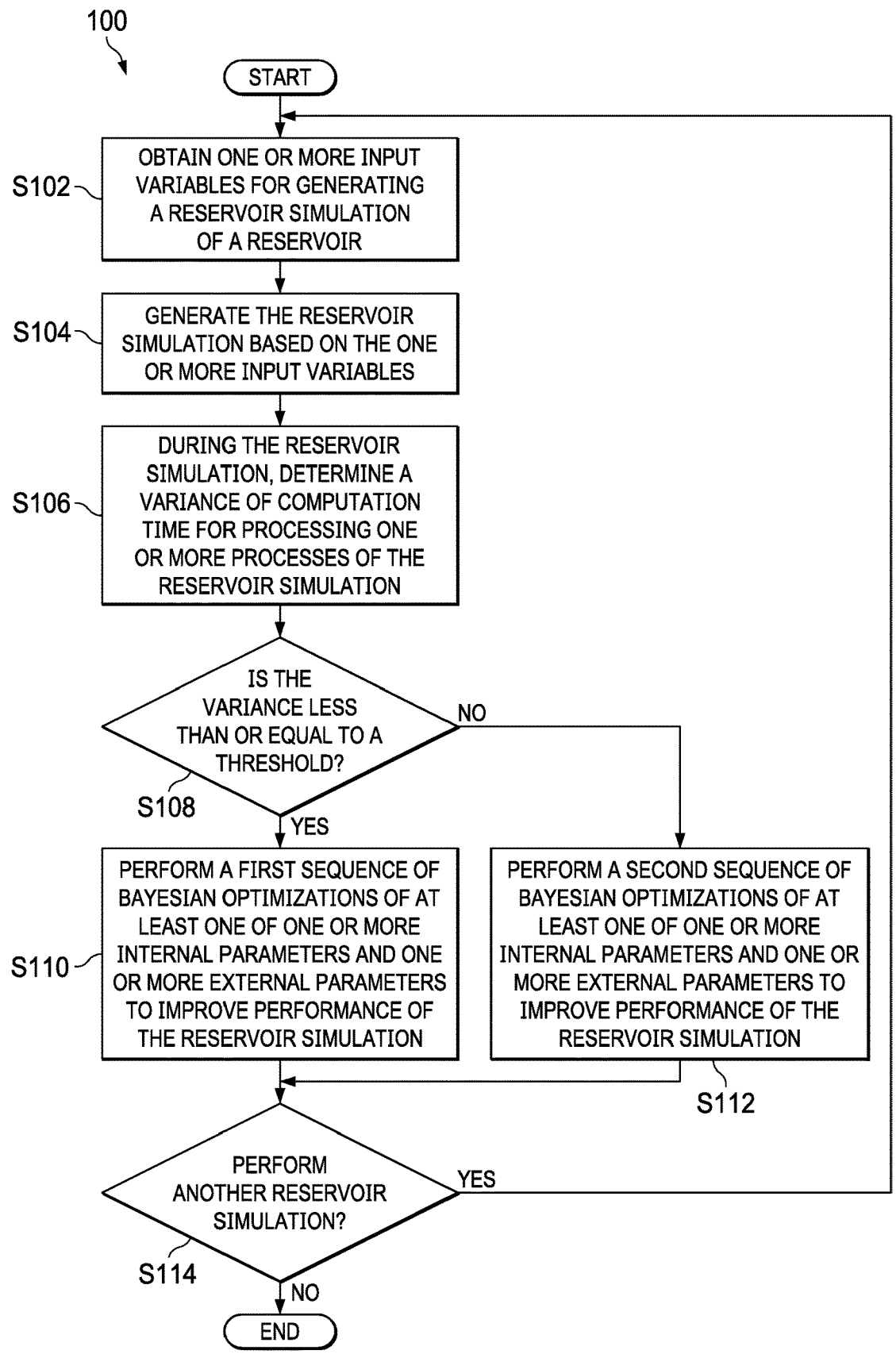
FIG. 1 is a flowchart of a process to dynamically improve performance of a reservoir simulation.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to reservoir simulation systems and methods to dynamically improve performance of reservoir simulations. As referred to herein, a reservoir simulation system is a system formed from one or more electronic devices that individually or collectively perform operations described herein to generate one or more reservoir simulations. Examples of such electronic devices include, but are not limited to, desktop computers, laptop computers, server computers, tablet computers, smart phones, as well as other types of electronic devices operable to generate one or more reservoir simulations. Examples of reservoir simulations include, but are not limited to, simulations of hydrocarbon production of a reservoir over time, simulations of the amount of reservoir fluids (e.g., water) that flow into a wellbore over time, simulations of the cost of hydrocarbon production over time, simulations of the structure integrity of the reservoir over time, as well as other types of simulations of the reservoir. In some embodiments, a reservoir simulation includes a single simulation run of the respective simulation. In some embodiments, a reservoir simulation includes multiple simulation runs of the respective simulation.

The reservoir simulation system includes a storage medium for storing data associated with simulations of a reservoir, such as, but not limited to, input variables for generating a reservoir simulation, output variables of the reservoir simulation, internal parameters that control the performance of the reservoir simulation, external parameters that control the performance of the reservoir simulation, historical data of previous simulation runs or simulations, as well as other types of data that are associated with simulations of the reservoir. As referred to herein, input variables are variables that are used to generate the reservoir simulation. Examples of input variables include, but are not limited to, fluid properties of a fluid flowing in a reservoir being simulated, properties of the reservoir being simulated, etc. In some embodiments, input variables are provided by the user. In some embodiments, input variables are predetermined or are selected from a recently generated reservoir simulation. Further, as referred to herein, output variables are one or more variables that are solved by the reservoir simulation. Examples of output variables include, but are not limited to, the amount of hydrocarbon resources produced (e.g., instantaneous output, output over time, etc.) by the reservoir being simulated, the amount of pressure at a location of the reservoir being simulated, the conductivity of the reservoir being simulated, etc. Further, as referred to herein, internal parameters are parameters and/or preconditions of one or more algorithms used to generate the reservoir simulation, whereas external parameters are parameters of one or more hardware components used to generate the reservoir simulation. Examples of external parameters include, but are not limited to, the number of processors, the number of simulation runs, etc.

The reservoir monitoring system also includes one or more processors individually or collectively assigned to perform operations described herein, including obtaining input variables, internal parameters, and external parameters used in a reservoir simulation from the storage medium, generating a reservoir simulation based on the one or more input variables, determining a variance of the computation time for processing one or more processes of the reservoir simulation, and determining whether to perform a static optimization of the reservoir simulation or a dynamic optimization of the reservoir simulation based on the variance of the computation time for processing the one or more processes. Examples of methods for determining the variance of the computation time are provided in the paragraphs below. As referred to herein, a dynamic optimization of the reservoir simulation is a process to improve the reservoir simulation if the variance of the computation time is less than or equal to a threshold. The processors, in response to a determination that the variance of the computation time is less than or equal to the threshold, determine to perform a dynamic optimization of the reservoir simulation, and perform a first sequence of Bayesian Optimizations of one or more internal parameters and/or one or more external parameters of the reservoir simulation. Additional descriptions of a process for performing the first sequence of Bayesian Optimization are provided in the paragraphs below and are illustrated in at least FIGS. 1 and 2B. Further, as referred to herein, a static optimization of the reservoir simulation is a process to improve the reservoir simulation if the variance of the computation time is greater than the threshold value. In that regard, the processors, in response to determining that the variance of the computation time is greater than the threshold value, perform a second sequence of Bayesian Optimizations of one or more internal parameters and/or one or more external parameters of the reservoir simulation to improve performance of the reservoir simulation. Additional descriptions of a process for performing the second sequence of Bayesian Optimization are provided in the paragraphs below and are illustrated in at least FIGS. 1 and 2A.

As referred to herein, a reservoir simulation is improved if the computing cost of performing the reservoir simulation is reduced, if the reservoir simulation is run more efficiently, and/or if the computation time is reduced. Examples of improving the reservoir simulation include, but are not limited to, reducing the computation time of the reservoir simulation to below a threshold period of computation time, reducing the cost of the reservoir simulation to under a threshold number of processors used to perform the reservoir simulation, reducing the energy utilization by one or more of the processors (e.g., mean energy consumption, variance in energy consumption, maximum energy consumption) to less than a threshold amount of energy consumption, reducing the computation time (e.g., variance in computation time, mean computation time, maximum computation time) of the processors to below a threshold amount of time, etc. In some embodiments, a reservoir simulation is improved by improving the values of the internal and external parameters that control the reservoir simulation. For example, where a value for an external parameter is number of processors, the computation time to perform the reservoir simulation can be changed by changing the number of processors, and the reservoir simulation is improved if the computation time to perform the reservoir simulation is reduced to a threshold time (e.g., under one minute, under 15 seconds, etc.) or is reduced by a threshold percentage (e.g., 10%, 15%, etc.) In some embodiments, the processors also obtain output variables of the reservoir simulation, the computation time of the reservoir simulation, and provide values of the output variables and the computation time for display. Additional descriptions of the foregoing systems and methods to dynamically improve performance of reservoir simulations are described in the paragraphs below and are illustrated in FIGS. 1-3.

Now turning to the figures, FIG. 1 is a flowchart of a process 100 to dynamically improve performance of a reservoir simulation. Although operations in the process 100 are shown in a particular sequence, certain operations may be performed in different sequences or at the same time where feasible.

At block S102, one or more input variables for generating a reservoir simulation of a reservoir are obtained, where the reservoir simulation is associated with at least one of one or more internal parameters and one or more external parameters that control the performance of the reservoir simulation. In some embodiments, one or more of the internal and external parameters are provided by the user (e.g., a designation by the user to use no more than 10 processing units, a designation by the user to balance the load of the processors, a designation by the user to run a reservoir simulation for x number of times, etc.). In some embodiments, values of the one or more of the internal and external parameters are predetermined, or are based on values of a recently-run simulation.

At block S104, a reservoir simulation is generated based on the one or more input variables. Examples of reservoir simulations include, but are not limited to, simulations of hydrocarbon production, simulations of the environment of the reservoir over time, as well as other types of simulations of the properties of the reservoir or the environment of the reservoir. As stated herein, in some embodiments, the reservoir simulation includes one or more simulation runs of the reservoir simulation over a period of time. At block S106, during the reservoir simulation, a variance of the computation time for processing the one or more processes of the reservoir simulation is determined. In some embodiments, the variance of computation time is a range of the computation times over a threshold number of time steps (e.g., 10, 15, 20, or another number of steps). For example, if the computation time over 10 time steps range from 5-15, then the variance over 10 time steps is 10. In some embodiments, the variance of computation time is the difference between a mean of the computation time over a first threshold number of time steps and a mean of the computation time over a second threshold number of time steps. For example, where the average computation time over the first threshold number of time steps (e.g., 10 time steps) is 10, and where the average computation time over the second threshold number of time steps (e.g., 10 steps) is 14, then variance of computation time is 4. In some embodiments, the variance of the computation time is an average of the squared differences from the mean computation time over a threshold number of time steps.

At block S108, a determination of whether the variance is less than or equal to a threshold (e.g., 10, 5%, or another numerical value) is determined. In some embodiments, the threshold is a user-inputted value. In some embodiments, the threshold is a predetermined value. In some embodiments, the threshold is based on a threshold used in an earlier reservoir simulation. The process proceeds from block S108 to S110 if the variance is less than or equal to the threshold. At block S110, and in response to a determination that the variance of computation time is less than or equal to the threshold, a first sequence of Bayesian Optimizations of the at least one of the one or more internal parameters and the one or more external parameters is performed to improve performance of the reservoir simulation, such as, but not limited to, reducing the computation time of the reservoir simulation to below a threshold period of computation time, reducing the cost of the reservoir simulation to under a threshold number of processors used to perform the reservoir simulation, reducing the energy utilization by one or more of the processors (e.g., mean energy consumption, variance in energy consumption, maximum energy consumption) to less than a threshold amount of energy consumption, reducing the computation time (e.g., variance in computation time, mean computation time, maximum computation time) of the processors to below a threshold amount of time, etc. As described herein, a dynamic optimization of the reservoir simulation system is performed if the variance of the computation time is less than or equal to the threshold. Additional descriptions of the first sequence of Bayesian Optimizations are provided in the paragraphs below and are illustrated in at least FIG. 2B. The process then proceeds to block S114.

Alternatively, the process proceeds from block S108 to S112 if the variance is greater than the threshold. At block S112, and in response to a determination that the variance of computation time is greater than the threshold, a second sequence of Bayesian Optimizations of the at least one of the one or more internal parameters and the one or more external parameters is performed to improve performance of the reservoir simulation. As described herein, a static optimization of the reservoir simulation system is performed if the variance of the computation time is greater than the threshold. Additional descriptions of the second sequence of Bayesian Optimizations are provided in the paragraphs below and are illustrated in at least FIG. 2A. The process then proceeds to block S114.

In some embodiments, where the variance is less than or equal to the threshold, either the first sequence of Bayesian Optimizations or the second sequence of Bayesian Optimizations is performed. In one or more of such embodiments, and in response to a determination at block S108 that the variance is less than or equal to the threshold, the user is prompted to select whether the user would like the first sequence of Bayesian Optimizations (proceed to block S110) or the second sequence of Bayesian Optimizations (proceed to block S112) to be performed. In one or more of such embodiments, and in response to a determination at block S108 that the variance is less than or equal to the threshold, the processors dynamically determine whether to perform the first sequence of the Bayesian Optimizations or the second sequence of Bayesian Optimizations. In one or more of such embodiments, the processors determine whether to perform the first sequence of the Bayesian Optimizations or the second sequence of Bayesian Optimizations based on a previous user selection. In one or more of such embodiments, the processors determine the cost (e.g., computation time, energy consumption, number of processors, etc.) of performing the first sequence of Bayesian Optimizations and the second sequence of Bayesian Optimizations, and determines whether to perform the first sequence of the Bayesian Optimizations or the second sequence of Bayesian Optimizations based on the cost of performing the respective sequences of Bayesian Optimizations.

At block S114, a determination of whether to perform another reservoir simulation is made. The process then returns to block S102 in response to a determination to perform another reservoir simulation. Alternatively, the process ends if a determination not to perform another reservoir simulation is made. In some embodiments, one or more output variables (e.g., the amount of hydrocarbon resources produced (e.g., instantaneous output, output over time, etc.) by the reservoir being simulated, the amount of pressure at a location of the reservoir being simulated, the conductivity of the reservoir being simulated, etc.) of the reservoir simulation and the computation time of the reservoir simulation are also obtained and the values of the output variables and the computation time are provided for display (e.g., a display of an electronic device of the user).

Figure 2A:
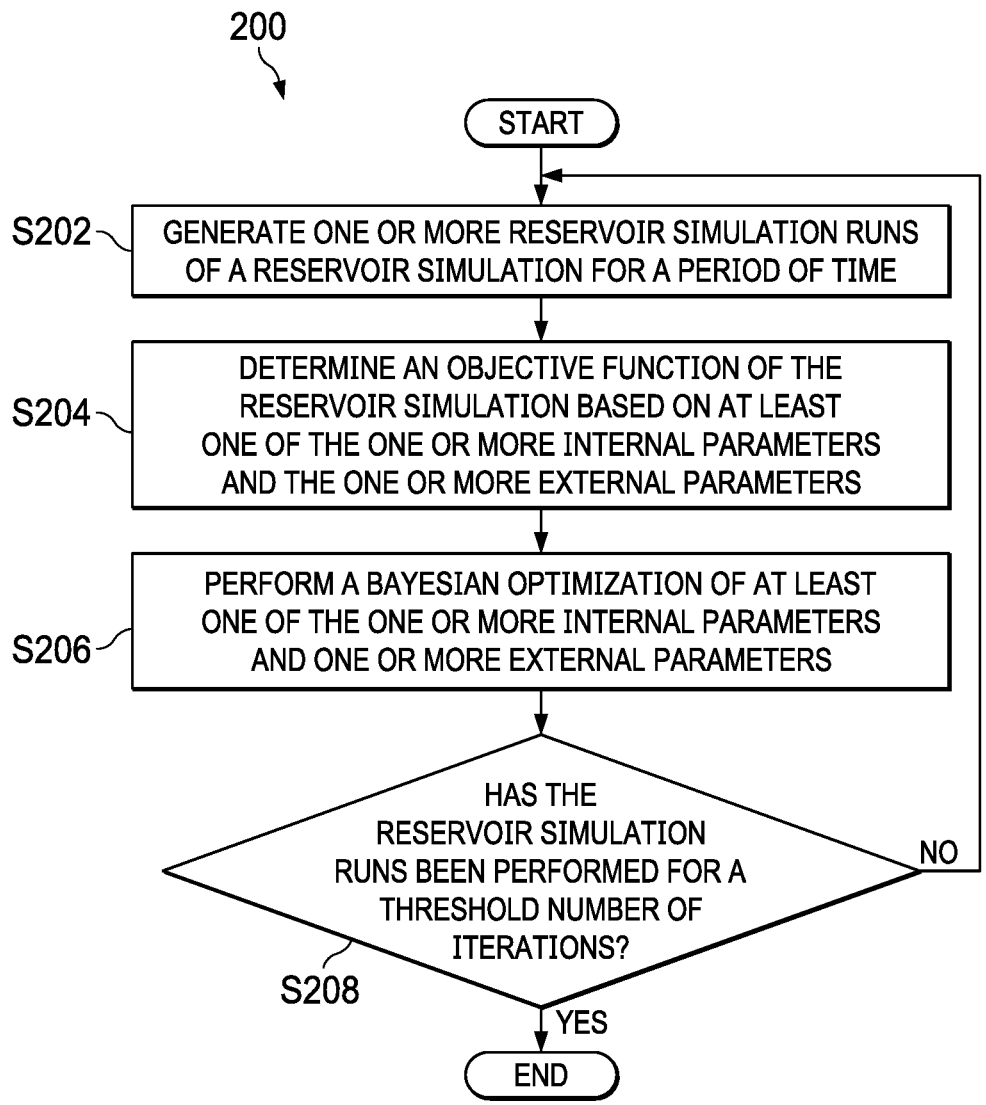
FIG. 2A is a flowchart of a process to perform a static optimization of a reservoir simulation.
Figure 3:
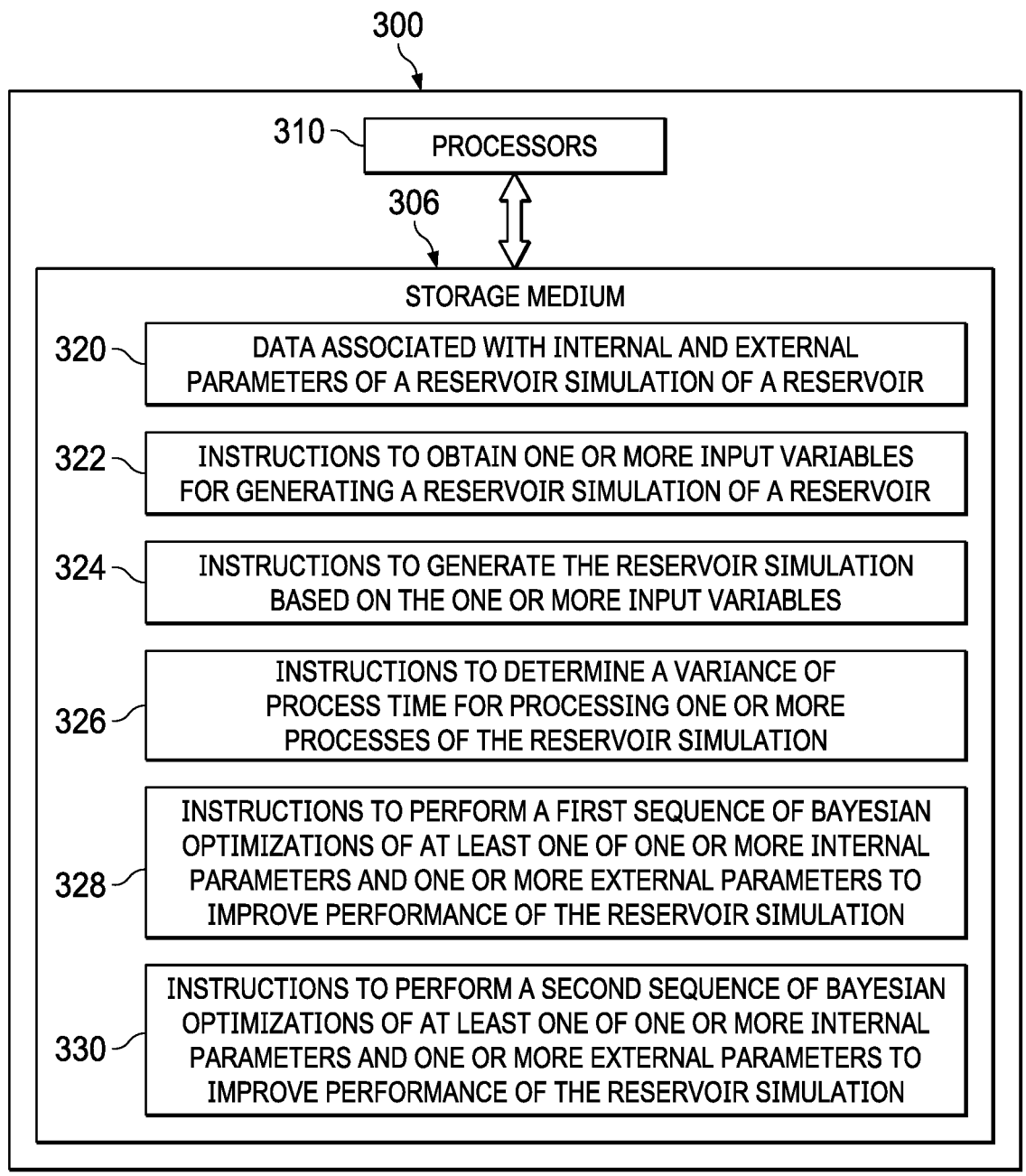
FIG. 3 is a block diagram of a reservoir simulation system operable to perform the processes illustrated in FIGS. 1, 2A, and 2B.

FIG. 2A is a flowchart of a process 200 to perform a static optimization of a reservoir simulation Although operations in the process 200 are shown in a particular sequence, certain operations may be performed in different sequences or at the same time where feasible.

At block S202, one or more reservoir simulation runs of a reservoir simulation are run for a threshold number of iterations (e.g., 1 iteration, 10 iterations, or another integer number of iterations), each iteration lasting for a period of time (e.g., 1 millisecond, 1 second, duration of a threshold number of simulation runs, or another period of time). In some embodiments, the number of threshold iterations and the duration of the period of time per iteration are provided by the user. In some embodiments, the number of threshold iterations and the duration of the period of time are predetermined. In some embodiments, different iterations last different durations of time.

At block S204, an objective function of the reservoir simulation is determined based on at least one of the one or more internal parameters and one or more external parameters. As referred to herein, an objective function (e.g. computation time) of the reservoir simulation is a function of the reservoir simulation and depends on the internal and external parameters, where one goal of the processes described herein is to determine values of one or more internal and/or external parameters at which objective function is optimum (e.g. minimum computation time, computation time is below a threshold value, minimum number of processors used, less than a threshold number of processors used, the variance of the number of computations performed by different processors is less than a threshold value, the energy consumption of the processors is less than a threshold amount of energy consumption, etc.). A few examples of objective function are, computation time, computation cost, energy consumption, etc.

At block S206, a Bayesian Optimization of at least one of the one or more internal parameters and one or more external parameters are performed by utilizing calculated values for objective function to obtain new values for at least one of the internal parameters and the external parameters. In some embodiments, the Bayesian Optimization includes an acquisition function that suggests new values for the internal and external parameters based on previously-obtained values for objective function. At block S208, a determination of whether the reservoir simulation runs have been performed for a threshold number of iterations is made. The process returns to block S202 if the reservoir simulation runs have not been performed for the threshold number of iterations, and the operations described in blocks S202, S204, and S206 are performed again during and/or after a subsequent iteration, where one or more reservoir simulation runs in the next iteration are controlled by the new values of the internal parameters and/or external parameters obtained in the current iteration. In some embodiments, a Bayesian Optimization performed during the next iteration utilizes all previously-obtained values for objective function (at different values for internal and external parameters) to obtain new values for the internal and/or external parameters. The process described in blocks S202, S204, and S206, and S208 are repeated for threshold number of iterations, and then values of the internal and external parameters are identified for which value of objective function is optimum (e.g. minimum computation time, computation time is below a threshold value, minimum number of processors used, less than a threshold number of processors used, the variance of the number of computations performed by different processors is less than a threshold value, or the energy consumption of the processors is less than a threshold amount of energy consumption, etc). These identified values for the internal and/or external parameters provide improved performance and are then utilized for reservoir simulation run. Alternatively, the process ends if the reservoir simulations have been performed for the threshold number of iterations.

Figure 2B:
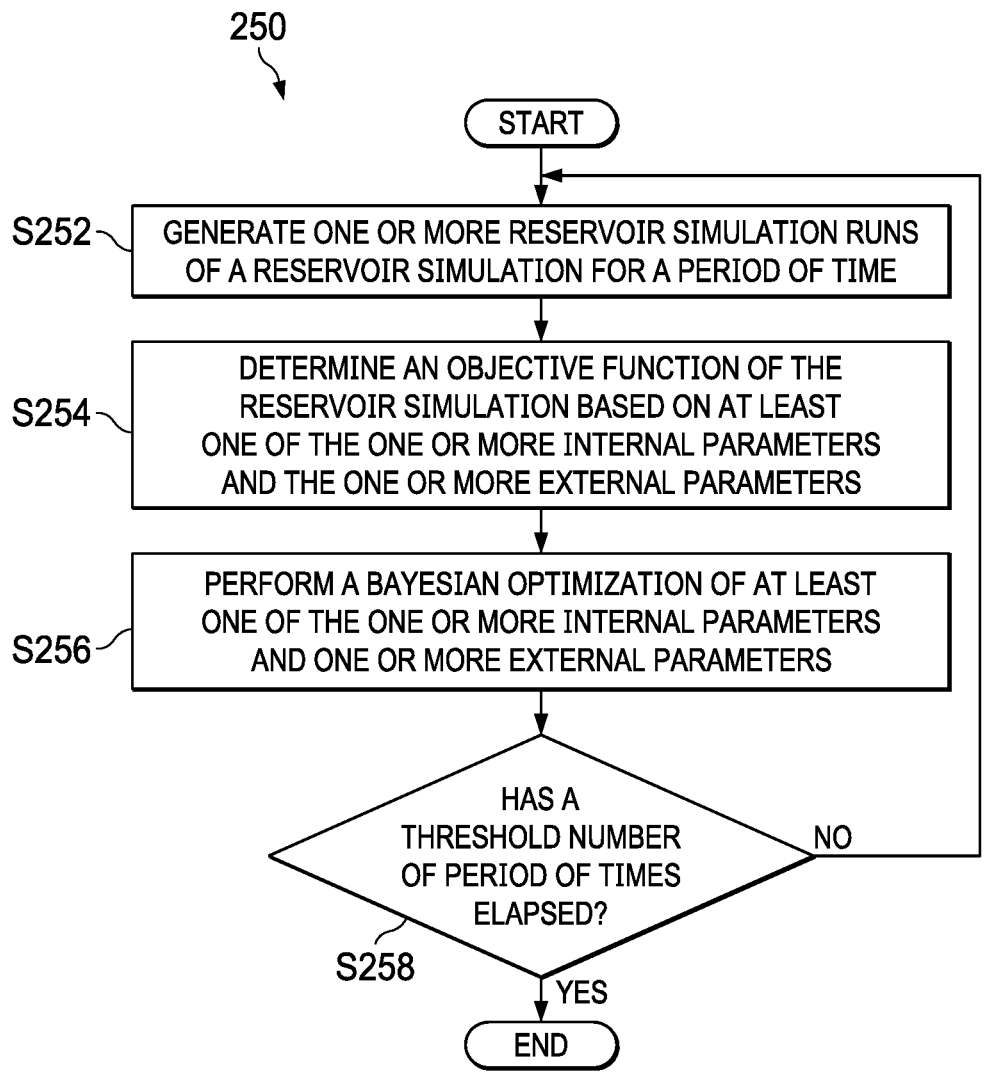
FIG. 2B is a flowchart of a process to perform a dynamic optimization of a reservoir simulation.

FIG. 2B is a flowchart of a process 250 to perform a dynamic optimization of a reservoir simulation. Although operations in the process 250 are shown in a particular sequence, certain operations may be performed in different sequences or at the same time where feasible.

At block S252, one or more simulation runs of a reservoir simulation are generated for a period of time (e.g., 1 millisecond, 1 second, or another period of time). In some embodiments, the duration of the period of time is provided by the user. In some embodiments, the duration of the period of time is predetermined.

At block S254, an objective function of the reservoir simulation is determined based on at least one of the one or more internal parameters one or more external parameters. At block S256, a Bayesian Optimization of at least one of the one or more internal parameters and one or more external parameters are performed to obtain new values for at least one of the internal parameters and the external parameters. At block S258, a determination of whether a threshold number of periods of time has elapsed is made. In some embodiments, the value of the threshold number of periods of time is inputted by the user. In some embodiments, the value of the threshold number of periods of time is predetermined.

The process returns to block S252 if the threshold number of periods of times has not elapsed, and the operations described in blocks S252, S254, and S256 are performed again during and/or after the next period of time, where one or more reservoir simulation runs during the next period of time are controlled by the new values of the internal parameters and/or external parameters obtained in the current period of time. In some embodiments, a Bayesian Optimization performed during the next time period utilizes all previously-obtained values for the objective function (at different values for internal and external parameters) to obtain new values for the internal and/or external parameters. As the process described in blocks S252, S254, and S256, and S258 are repeated, values of the internal and/or external parameters, that control the reservoir simulation and value of objective function are changed. After threshold number of periods of time have elapsed, values of the internal and/or external parameters are identified at which value of objective function is optimum (e.g. minimum computation time, computation time is below a threshold value, minimum number of processors used, less than a threshold number of processors used, the variance of the number of computations performed by different processors is less than a threshold value, or the energy consumption of the processors is less than a threshold amount of energy consumption, etc). These identified values for internal and/or external parameters are then utilized in reservoir simulation runs. Alternatively, the process ends if the threshold number of periods of times have elapsed.

FIG. 3 is a block diagram of a reservoir simulation system 300 that is operable of performing operations illustrated in the processes of FIGS. 1, 2A, and 2B to dynamically improve performances of a reservoir simulation system. Reservoir simulation system 300 includes a storage medium 306 and one or more processors 310. Storage medium 306 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, storage medium 306 includes multiple data storage devices. In further embodiments, the multiple data storage devices may be physically stored at different locations. Processors 310 represent one or more processors that individually or collectively perform operations described herein. In some embodiments, the one or more processors are components of a single electronic device, such as a desktop computer. In some embodiments, the one or more processors are components of different electronic devices that are located locally or remote from each other. In some embodiments, certain processes of the processors are assigned to perform certain operations (e.g., performing a first sequence of the Bayesian Optimizations), while other processors of the one or more processors are assigned to perform other operations (e.g., performing a second sequence of the Bayesian Optimizations). In some embodiments, different processors are assigned different operations to balance the workload among the processors.

Data associated with simulations of a reservoir, such as, but not limited to, algorithms of simulations of the reservoir, user-inputted values (e.g., input variables, internal parameters, external parameters, number of iterations to run first and/or second sequences of Bayesian Optimizations, etc.), as well as predetermined values of variables and parameters described herein are stored at a first location 320 of storage medium 306. In one or more embodiments, historical data of prior reservoir simulations are also stored at first location 320 of the storage medium 306. As shown in FIG. 3, instructions to obtain one or more input variables for generating a reservoir simulation of a reservoir are stored in a second location 322. Further, instructions to generate the reservoir simulation based on the one or more input variables are stored in a third location 324. Further, instructions to determine a variance of process time for processing one or more processes of the reservoir simulation are stored at a fourth location 326. Further, instructions to perform a first sequence of Bayesian Optimizations of at least one of the one or more internal parameters and one or more external parameters to improve performance of the reservoir simulation are stored at a fifth location 328. Further, instructions to perform a second sequence of Bayesian Optimizations of at least one of the one or more internal parameters and one or more external parameters to improve performance of the reservoir simulation are stored at sixth location 330. Additional instructions that are performed by processor 310 are stored in other locations of the storage medium 306.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flow charts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a method to dynamically improve performance of a reservoir simulation, the method comprising: obtaining one or more input variables for generating a reservoir simulation of a reservoir, the reservoir simulation comprising a plurality of reservoir simulation runs, and the reservoir simulation being associated with at least one of one or more internal parameters and one or more external parameters that control performance of the reservoir simulation; generating the reservoir simulation based on the one or more input variables; during the reservoir simulation, determining a variance of computation time for processing one or more processes of the reservoir simulation; in response to a determination that the variance of computation time is less than or equal to a threshold, performing a first sequence of Bayesian Optimizations of the at least one of the one or more internal parameters and the one or more external parameters to improve performance of the reservoir simulation; and in response to at least one of the determination that the variance of computation time is greater than the threshold, performing a second sequence of Bayesian Optimizations of the at least one of the one or more internal parameters and the one or more external parameters to improve performance of the reservoir simulation, wherein the one or more internal parameters are parameters of one or more algorithms used to generate the reservoir simulation, and wherein the one or more external parameters are parameters of one or more hardware components used to generate the reservoir simulation.

Clause 2, the method of clause 1, wherein performing the first sequence of Bayesian Optimizations comprises: during each period of time of a threshold number of periods of time: generating one or more reservoir simulation runs of the reservoir simulation, wherein the one or more reservoir simulation runs are controlled by the at least one of the one or more internal parameters and the one or more external parameters; determining an objective function of the reservoir simulation based on the at least one of the one or more internal parameters and the one or more external parameters; and performing a Bayesian Optimization of the at least one of the one or more internal parameters and the one or more external parameters to obtain new values for the at least one of the one or more internal parameters and the one or more external parameters, wherein one or more reservoir simulation runs during a next period of time of the threshold number of periods of time are controlled by the new values for the at least one of the one or more internal parameters and the one or more external parameters.

Clause 3, the method of clause 2, further comprising receiving a threshold value indicative of the threshold number of period of times, wherein the threshold value is a user-inputted value.

Clause 4, the method of any of clauses 1-3, wherein performing the second sequence of Bayesian Optimizations comprises: for each iteration of a threshold number of iterations: generating one or more reservoir simulation runs of the reservoir simulation for a threshold period of time, wherein the one or more reservoir simulation runs are controlled by the one or more internal parameters and the one or more external parameters; determining an objective function of the reservoir simulation based on the at least one of the one or more internal parameters and the one or more external parameters; and performing a Bayesian Optimization of the at least one of the one or more internal parameters and the one or more external parameters to obtain new values for the at least one of the one or more internal parameters and the one or more external parameters, wherein one or more reservoir simulation runs in a next iteration of the threshold number of iterations are controlled by the new values for the at least one of the one or more internal parameters and the one or more external parameters.

Clause 5, the method of any of clauses 1-4, wherein improving the performance of the reservoir simulation comprises reducing computation time of the reservoir simulation to below a threshold period of computation time.

Clause 6, the method of any of clauses 1-5, wherein improving the performance of the reservoir simulation comprises reducing a cost of computing the reservoir simulation to under a threshold number of processors that perform the reservoir simulation.

Clause 7, the method of any of clauses 1-6, wherein improving the performance of the reservoir simulation comprises reducing energy utilization by one or more processors that perform the reservoir simulation to below a threshold amount of energy consumption.

Clause 8, the method of any of clauses 1-7, wherein improving the performance of the reservoir simulation comprises reducing a variance of computation time by different processors of one or more processors that perform the reservoir simulation to below a threshold amount of time.

Clause 9, the method of any of clauses 1-8, further comprising after performing at least one of the first sequence of Bayesian Optimizations and the second sequence of Bayesian Optimizations, providing values of the one or more internal parameters and the one or more external parameters for display.

Clause 10, the method of any of clauses 1-9, further comprising: obtaining one or more output variables of the reservoir simulation; obtaining a computation time of the reservoir simulation; and providing values of the one or more output variables and the computation time for display.

Clause 11, the method of any of clauses 1-10, wherein in response to a determination that the variance of computation time is less than or equal to the threshold, performing one of the first sequence of Bayesian Optimizations of the at least one of the one or more internal parameters and the one or more external parameters or the second sequence of Bayesian Optimizations of the at least one of the one or more internal parameters and the one or more external parameters.

Clause 12, a reservoir simulation system, comprising: a storage medium for storing data associated with simulations of a reservoir; and one or more processors operable to: obtain one or more input variables for generating a reservoir simulation of a reservoir, the reservoir simulation comprising a plurality of reservoir simulation runs, and the reservoir simulation being associated with at least one of one or more internal parameters and one or more external parameters that control performance of the reservoir simulation; generate the reservoir simulation based on the one or more input variables; during the reservoir simulation, determine a variance of computation time for processing one or more processes of the reservoir simulation; in response to a determination that the variance of computation time is less than or equal to a threshold, perform a first sequence of Bayesian Optimizations of the at least one of the one or more internal parameters and the one or more external parameters to improve performance of the reservoir simulation; and in response to at least one of the determination that the variance of computation time is greater than the threshold, perform a second sequence of Bayesian Optimizations of the at least one of the one or more internal parameters and the one or more external parameters to improve performance of the reservoir simulation, wherein the one or more internal parameters are parameters of one or more algorithms used to generate the reservoir simulation, and wherein the one or more external parameters are parameters of one or more hardware components used to generate the reservoir simulation.

Clause 13, the reservoir simulation system of clause 12, wherein in response to a determination that the variance of computation time is greater than the threshold, the one or more processors are operable to: for each iteration of a threshold number of iterations: generate one or more reservoir simulation runs of the reservoir simulation for a threshold period of time, wherein the one or more reservoir simulation runs are controlled by the one or more internal parameters and the one or more external parameters; determine an objective function of the reservoir simulation based on the at least one of the one or more internal parameters and the one or more external parameters; and perform a Bayesian Optimization of the at least one of the one or more internal parameters and the one or more external parameters to obtain new values for the at least one of the one or more internal parameters and the one or more external parameters, wherein one or more reservoir simulation runs in a next iteration of the threshold number of iterations are controlled by the new values for the at least one of the one or more internal parameters and the one or more external parameters.

Clause 14, the reservoir simulation system of clauses 12 or 13, wherein in response to a determination that the variance of computation time is less than or equal to the threshold, the one or more processors are operable to: during each period of time of a threshold number of periods of time: generate one or more reservoir simulation runs of the reservoir simulation, wherein the one or more reservoir simulation runs are controlled by the at least one of the one or more internal parameters and the one or more external parameters; determine an objective function of the reservoir simulation based on the at least one of the one or more internal parameters and the one or more external parameters; and perform a Bayesian Optimization of the at least one of the one or more internal parameters and the one or more external parameters to obtain new values for the at least one of the one or more internal parameters and the one or more external parameters, wherein one or more reservoir simulation runs during a next period of time of the threshold number of periods of time are controlled by the new values for the at least one of the one or more internal parameters and the one or more external parameters.

Clause 15, the reservoir simulation system of any of clauses 12-14, wherein the one or more processors are operable to reduce computation time of the reservoir simulation to below a threshold period of computation time to improve the performance of the reservoir simulation.

Clause 16, the reservoir simulation system of any of clauses 12-15, wherein the one or more processors are operable to reduce a cost of computing the reservoir simulation to under a threshold number of processes to improve the performance of the reservoir simulation.

Clause 17, the reservoir simulation system of any of clauses 12-16, wherein the one or more processors are operable to reduce energy utilization by one or more processors that perform the reservoir simulation to below a threshold amount of energy consumption to improve the performance of the reservoir simulation.

Clause 18, the reservoir simulation system of any of clauses 12-17, wherein the one or more processors are operable to reduce a variance of a number of computations performed by different processors of one or more processors that perform the reservoir simulation to below a threshold number of computations to improve the performance of the reservoir simulation.

Clause 19, a machine-readable medium comprising instructions stored therein, which when executed by one or more processors, causes the one or more processors to perform operations comprising: obtaining one or more input variables for generating a reservoir simulation of a reservoir, the reservoir simulation comprising a plurality of reservoir simulation runs, and the reservoir simulation being associated with at least one of one or more internal parameters and one or more external parameters that control performance of the reservoir simulation; generating the reservoir simulation based on the one or more input variables; during the reservoir simulation, determining a variance of computation time for processing one or more processes of the reservoir simulation; in response to a determination that the variance of computation time is less than or equal to a threshold, during each period of time of a threshold number of periods of time: generating one or more reservoir simulation runs of the reservoir simulation, wherein the one or more reservoir simulation runs are controlled by the at least one of the one or more internal parameters and the one or more external parameters; determining an objective function of the reservoir simulation based on the at least one of the one or more internal parameters and the one or more external parameters; and performing a Bayesian Optimization of the at least one of the one or more internal parameters and the one or more external parameters to obtain new values for the at least one of the one or more internal parameters and the one or more external parameters, wherein one or more reservoir simulation runs during a next period of time of the threshold number of periods of time are controlled by the new values for the at least one of the one or more internal parameters and the one or more external parameters, and in response to a determination that the variance of computation time is 1 greater than the threshold, during each period of time of a threshold number of periods of time: for each iteration of a threshold number of iterations: generating one or more reservoir simulation runs of the reservoir simulation for a threshold period of time, wherein the one or more reservoir simulation runs are controlled by the one or more internal parameters and the one or more external parameters; determining an objective function of the reservoir simulation based on the at least one of the one or more internal parameters and the one or more external parameters; and performing a Bayesian Optimization of the at least one of the one or more internal parameters and the one or more external parameters to obtain new values for the at least one of the one or more internal parameters and the one or more external parameters, wherein one or more reservoir simulation runs in a next iteration of the threshold number of iterations are controlled by the new values for the at least one of the one or more internal parameters and the one or more external parameters.

Clause 20, the machine-readable medium of clause 19, wherein the instructions, which when executed by one or more processors, causes the one or more processors to perform operations comprising: obtaining one or more output variables of the reservoir simulation; obtaining a computation time of the reservoir simulation; and providing values of the one or more output variable and the computation time for display.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A method to dynamically improve performance of a reservoir simulation, the method comprising:
obtaining one or more input variables for generating a reservoir simulation of a reservoir, the reservoir simulation comprising a plurality of reservoir simulation runs, and the reservoir simulation being associated with at least one of one or more internal parameters and one or more external parameters that control performance of the reservoir simulation;
generating the reservoir simulation based on the one or more input variables;
during the reservoir simulation, determining a variance of computation time for processing one or more processes of the reservoir simulation; and
in response to a determination that the variance of computation time is greater than a threshold, performing a second sequence of Bayesian Optimizations of the at least one of the one or more internal parameters and the one or more external parameters to improve performance of the reservoir simulation, wherein the Bayesian Optimizations of the at least one of the one or more internal parameters and the one or more external parameters comprises a first sequence and the second sequence,
wherein the one or more internal parameters are parameters of one or more algorithms used to generate the reservoir simulation, and
wherein the one or more external parameters are parameters of one or more hardware components used to generate the reservoir simulation.

2. The method of claim 1, wherein performing the second sequence of Bayesian Optimizations comprises:
for each iteration of a threshold number of iterations:
generating one or more reservoir simulation runs of the reservoir simulation for a threshold period of time, wherein the one or more reservoir simulation runs are controlled by the one or more internal parameters and the one or more external parameters;
determining an objective function of the reservoir simulation based on the at least one of the one or more internal parameters and the one or more external parameters; and
performing a Bayesian Optimization of the at least one of the one or more internal parameters and the one or more external parameters to obtain new values for the at least one of the one or more internal parameters and the one or more external parameters,
wherein one or more reservoir simulation runs in a next iteration of the threshold number of iterations are controlled by the new values for the at least one of the one or more internal parameters and the one or more external parameters.

3. The method of claim 1, wherein improving the performance of the reservoir simulation comprises reducing computation time of the reservoir simulation to below a threshold period of computation time.

4. The method of claim 1, wherein improving the performance of the reservoir simulation comprises reducing a cost of computing the reservoir simulation to under a threshold number of processors that perform the reservoir simulation.

5. The method of claim 1, wherein improving the performance of the reservoir simulation comprises reducing energy utilization by one or more processors that perform the reservoir simulation to below a threshold amount of energy consumption.

6. The method of claim 1, wherein improving the performance of the reservoir simulation comprises reducing a variance of computation time by different processors of one or more processors that perform the reservoir simulation to below a threshold amount of time.

7. The method of claim 1, further comprising after performing at least one of the first sequence of Bayesian Optimizations and the second sequence of Bayesian Optimizations, providing values of the one or more internal parameters and the one or more external parameters for display.

8. The method of claim 1, further comprising:
obtaining one or more output variables of the reservoir simulation;
obtaining a computation time of the reservoir simulation; and
providing values of the one or more output variables and the computation time for display.

9. The method of claim 1, further comprising: determining that the variance of computation time is less than or equal to the threshold and performing the first sequence of Bayesian Optimizations of the one or more internal parameters and the one or more external parameters to improve performance of the reservoir simulation.

10. The method of claim 9, wherein performing the first sequence of Bayesian Optimizations comprises:
during each period of time of a threshold number of periods of time:
generating one or more reservoir simulation runs of the reservoir simulation, wherein the one or more reservoir simulation runs are controlled by the at least one of the one or more internal parameters and the one or more external parameters;
determining an objective function of the reservoir simulation based on the at least one of the one or more internal parameters and the one or more external parameters; and
performing a Bayesian Optimization of the at least one of the one or more internal parameters and the one or more external parameters to obtain new values for the at least one of the one or more internal parameters and the one or more external parameters,
wherein one or more reservoir simulation runs during a next period of time of the threshold number of periods of time are controlled by the new values for the at least one of the one or more internal parameters and the one or more external parameters.

11. The method of claim 10, further comprising receiving a threshold value indicative of the threshold number of period of times, wherein the threshold value is a user-inputted value.

12. The method of claim 9, wherein in response to a determination that the variance of computation time is less than or equal to the threshold, performing one of the first sequence of Bayesian Optimizations of the at least one of the one or more internal parameters and the one or more external parameters or the second sequence of Bayesian Optimizations of the at least one of the one or more internal parameters and the one or more external parameters.

13. A reservoir simulation system, comprising:
a storage medium for storing data associated with simulations of a reservoir; and
one or more processors operable to:
obtain one or more input variables for generating a reservoir simulation of a reservoir, the reservoir simulation comprising a plurality of reservoir simulation runs, and the reservoir simulation being associated with at least one of one or more internal parameters and one or more external parameters that control performance of the reservoir simulation;
generate the reservoir simulation based on the one or more input variables;
during the reservoir simulation, determine a variance of computation time for processing one or more processes of the reservoir simulation; and in response to a determination that the variance of computation time is greater than a threshold, perform a second sequence of Bayesian Optimizations of the at least one of the one or more internal parameters and the one or more external parameters to improve performance of the reservoir simulation, wherein the Bayesian Optimizations of the at least one of the one or more internal parameters and the one or more external parameters comprises a first sequence and the second sequence, wherein the one or more internal parameters are parameters of one or more algorithms used to generate the reservoir simulation, and wherein the one or more external parameters are parameters of one or more hardware components used to generate the reservoir simulation.

14. The reservoir simulation system of claim 13, wherein the one or more processors are operable to reduce computation time of the reservoir simulation to below a threshold period of computation time to improve the performance of the reservoir simulation.

15. The reservoir simulation system of claim 13, wherein the one or more processors are operable to reduce a cost of computing the reservoir simulation to under a threshold number of processes to improve the performance of the reservoir simulation.

16. The reservoir simulation system of claim 13, wherein the one or more processors are operable to reduce energy utilization by one or more processors that perform the reservoir simulation to below a threshold amount of energy consumption to improve the performance of the reservoir simulation.

17. The reservoir simulation system of claim 13, wherein the one or more processors are operable to reduce a variance of a number of computations performed by different processors of one or more processors that perform the reservoir simulation to below a threshold number of computations to improve the performance of the reservoir simulation.

18. The reservoir simulation system of claim 13, further comprising: determining that the variance of computation time is less than or equal to the threshold and performing the first sequence of Bayesian Optimizations of the one or more internal parameters and the one or more external parameters to improve performance of the reservoir simulation.

19. The reservoir simulation system of claim 18, wherein in response to a determination that the variance of computation time is greater than the threshold, the one or more processors are operable to:

for each iteration of a threshold number of iterations:
generate one or more reservoir simulation runs of the reservoir simulation for a threshold period of time, wherein the one or more reservoir simulation runs are controlled by the one or more internal parameters and the one or more external parameters;

determine an objective function of the reservoir simulation based on the at least one of the one or more internal parameters and the one or more external parameters; and perform a Bayesian Optimization of the at least one of the one or more internal parameters and the one or more external parameters to obtain new values for the at least one of the one or more internal parameters and the one or more external parameters, wherein one or more reservoir simulation runs in a next iteration of the threshold number of iterations are controlled by the new values for the at least one of the one or more internal parameters and the one or more external parameters.

20. The reservoir simulation system of claim 18, wherein in response to a determination that the variance of computation time is less than or equal to the threshold, the one or more processors are operable to:

during each period of time of a threshold number of periods of time:
generate one or more reservoir simulation runs of the reservoir simulation, wherein the one or more reservoir simulation runs are controlled by the at least one of the one or more internal parameters and the one or more external parameters;

determine an objective function of the reservoir simulation based on the at least one of the one or more internal parameters and the one or more external parameters; and perform a Bayesian Optimization of the at least one of the one or more internal parameters and the one or more external parameters to obtain new values for the at least one of the one or more internal parameters and the one or more external parameters, wherein one or more reservoir simulation runs during a next period of time of the threshold number of periods of time are controlled by the new values for the at least one of the one or more internal parameters and the one or more external parameters.

21. A machine-readable medium comprising instructions stored therein, which when executed by one or more processors, causes the one or more processors to perform operations comprising:

obtaining one or more input variables for generating a reservoir simulation of a reservoir, the reservoir simulation comprising a plurality of reservoir simulation runs, and the reservoir simulation being associated with at least one of one or more internal parameters and one or more external parameters that control performance of the reservoir simulation;

generating the reservoir simulation based on the one or more input variables;

during the reservoir simulation, determining a variance of computation time for processing one or more processes of the reservoir simulation;

determining that the variance of computation time is 1 greater than a threshold, performing during each period of time of a threshold number of periods of time:

for each iteration of a threshold number of iterations:
generating one or more reservoir simulation runs of the reservoir simulation for a threshold period of time, wherein the one or more reservoir simulation runs are controlled by the one or more internal parameters and the one or more external parameters;

determining an objective function of the reservoir simulation based on the at least one of the one or more internal parameters and the one or more external parameters; and performing a Bayesian Optimization of the at least one of the one or more internal parameters and the one or more external parameters to obtain new values for the at least one of the one or more internal parameters and the one or more external parameters, wherein one or more reservoir simulation runs in a next iteration of the threshold number of iterations are controlled by the new values for the at least one of the one or more internal parameters and the one or more external parameters.

22. The machine-readable medium of claim 21, wherein the instructions, which when executed by one or more processors, causes the one or more processors to perform operations comprising:

obtaining one or more output variables of the reservoir simulation; obtaining a computation time of the reservoir simulation; and providing values of the one or more output variable and the computation time for display.

23. The machine-readable medium of claim 21, further comprising: determining that the variance of computation time is less than or equal to the threshold, performing during each period of time of a threshold number of periods of time: generating one or more reservoir simulation runs of the reservoir simulation, wherein the one or more reservoir simulation runs are controlled by the at least one of the one or more internal parameters and the one or more external parameters;

determining an objective function of the reservoir simulation based on the at least one of the one or more internal parameters and the one or more external parameters; and performing a Bayesian Optimization of the at least one of the one or more internal parameters and the one or more external parameters to obtain new values for the at least one of the one or more internal parameters and the one or more external parameters, wherein one or more reservoir simulation runs during a next period of time of the threshold number of periods of time are controlled by the new values for the at least one of the one or more internal parameters and the one or more external parameters.

* * * * *